United States Patent Office 3,305,555
Patented Feb. 21, 1967

3,305,555
PREPARATION OF TERTIARY AMINE BORANES INCLUDING PYRIDYL BORANES
Stanley Frank Stafiej, Springdale, and Edward Andrew Takacs, South Norwalk, Conn., assignors to American Cyanamid Company, Stamford, Conn., a corporation of Maine
No Drawing. Filed Mar. 9, 1964, Ser. No. 351,583
7 Claims. (Cl. 260—290)

This invention relates to a novel method for the preparation of boron-containing cations and to the novel boron-containing salts produced thereby. In its broadest aspects, the method of the present invention comprises reacting, under anhydrous conditions, a tertiary amine-borane with a trityl salt and a nucleophile or ligand. This invention also comprises those products wherein the central boron atom is bonded to two dissimilar ligand moieties.

This reaction may be represented by the following equation:

(I)

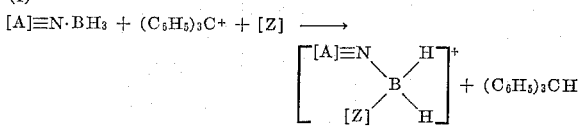

wherein $[A] \equiv N$ represents a tertiary amine ligand moiety in which the nitrogen atom shown is bonded only to carbon atoms of hydrocarbon or substituted hydrocarbon radicals and not more than one nitrogen atom of another amine radical and $[Z]$ represents a ligand selected from the group consisting of tertiary amines in which the nitrogen atom is bonded only to carbon atoms of hydrocarbon or substituted hydrocarbon radicals, nitriles, di-lower alkyl sulfides, and tertiary phosphines in which the phosphorus atom is bonded only to carbon atoms of hydrocarbon or substituted hydrocarbon radicals.

The tertiary amine portion of the amine-borane may have the formula (II)

wherein $R_1$, $R_2$, and $R_3$ are the same or different hydrocarbon radicals or substituted hydrocarbon radicals. For example, they may be lower alkyl (e.g., methyl, ethyl, n-propyl, isopropyl, butyl, etc.), aryl (e.g., phenyl, biphenyl, naphthyl, etc.), aralkyl (e.g., benzyl, xylyl etc.) alkaryl (e.g., tolyl, dimethyl-phenyl, ethyl-phenyl, cumenyl, etc.) or substituted forms thereof (e.g., containing one or more halogen, alkoxy, ester, thioether, etc. groups). Also, the tertiary amine portion of the amine-borane may have the formula (III)

wherein $R_4$ and $R_5$ are hydrocarbon radicals or substituted hydrocarbon radicals. For example, $R_4$ may be the same as previously described for $R_1$, $R_2$, and $R_3$; and $R_5$ may be a bivalent radical which, when joined to the nitrogen atom by both valences, forms a heterocyclic ring (e.g., pyrrole, pyrrolidine, pyrroline, piperazine, piperidine, pipecoline, etc.). Further, the tertiary amine portion of the amine-borane may have the formula (IV)

wherein $R_6$ is a hydrocarbon radical or substituted hydrocarbon radical which, in conjunction with the nitrogen atom, forms a heterocyclic ring (e.g., pyridine, naphthyridine, quinoline, pyrimidine, bipyridyl, etc.). Additionally, the tertiary amine portion of the amine-borane may be a hydrazine derivative having the formula (V)

wherein $R_7$ and $R_8$ may be the same as $R_1$, $R_2$, or $R_3$ above. All of the foregoing radicals and moieties have been listed in their simplest forms, but substituted forms thereof may also be used. Thus, they may contain fluorine, chlorine, bromine, or iodine atoms, ether linkages, ester linkages, alkoxy groups, thioether linkages, and other substituents attached thereto provided they do not adversely affect the desired reaction. Also, they may include additional tertiary amine portions providing a plurality of position to which a plurality of boranes can be secured by ligand linkages.

These tertiary amine-boranes can be prepared by the reaction of diborane with the appropriate anhydrous tertiary amine or by the reaction of the appropriate anhydrous tertiary amine-hydrochloride with an alkali borohydride [G. W. Schaeffer and E. R. Anderson, J.A.C.S., 71, 2143 (1949), M. D. Taylor, L. R. Grant, and C. A. Sands, J.A.C.S., 77, 1506 (1955)]. Illustrative of tertiary amine-boranes useful in the process of this invention are the following:

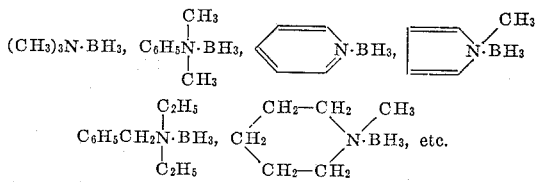

Among the trityl salts (or triphenylmethyl salts) useful for the performance of the present invention are trityl fluoroborate, and trityl perchlorate.

The nucleophile or ligand may be any of those tertiary amines previously described as comprising part of the amine-borane wherein only carbon atoms of hydrocarbon or substituted hydrocarbon radicals are bonded to the amine nitrogen. Also, the ligand can be any of the various nitriles, e.g., lower alkylnitriles (acetonitrile, propionitrile, butyronitrile, etc.), cyanogen, lower alkylene dinitriles (malononitrile, succinonitrile, glutaronitrile, etc.). Further, the ligand can be a di-lower alkyl sulfide, e.g., dimethyl sulfide, ethyl methyl sulfide, diethyl sulfide, substituted forms of the foregoing, etc. Additionally, the ligand can be a tertiary phosphine in which the phosphorus atom is bonded only to carbon atoms of hydrocarbon or substituted hydrocarbon radicals and which may have any of the formulae

   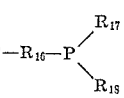
VI     VII     VIII

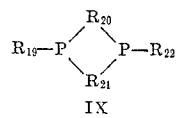
IX wherein $R_9$, $R_{10}$, $R_{11}$, $R_{12}$, $R_{14}$, $R_{15}$, $R_{17}$, $R_{18}$, $R_{18}$, and $R_{22}$ are monovalent hydrocarbon radicals which may be the same or different in any given formula $R_{13}$, $R_{16}$, $R_{20}$, and $R_{21}$ are bivalent radicals. These monovalent hydrocarbon radicals may be any of those previously described for $R_1$, $R_2$, or $R_3$ of Formula II. The bivalent hydrocarbon radical $R_{13}$ can be any of which, when joined to the phosphorus atom by both valences, forms a heterocyclic ring (e.g., tetramethylene, pentamethylene, $-CH_2-CH_2-O-CH_2-CH_2-$ —$CH_2$—$CH_2$—$CH_6$—$H_4(1,2)$—$CH_2$—, etc.). The bivalent hydrocarbon radicals $R_{16}$, $R_{20}$, and $R_{21}$ may be lower bivalent alkyl groups (e.g., methylene, ethylene, propylene, butylene, etc.) and, preferably, $R_{20}$ and $R_{21}$ together with the two phosphorus atoms of Formula IX should add up to a five or six atom heterocyclic ring for maximum stability. $R_{16}$ may also be a bivalent aryl, alkaryl, or aralkyl group (e.g., o-phenylene, m-phenylene, p-phenylene, o-xylylene, m-xylylene, p-xylylene, toluylene, naphthylene, etc.). Any of the foregoing hydrocarbon radicals may be substituted hydrocarbons in the same fashion as previously explained in connection with the tertiary amine portion of the amine-boranes. Illustrative of ligands useful in the process of this invention are the following:

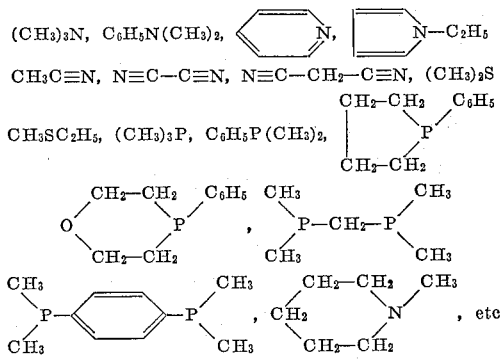

It is usually preferred to perform the foregoing reaction in the presence of a solvent, which may be an excess of the nucleophile or ligand used in the reaction. Thus, for example, where the ligand entering into the reaction is acetonitrile, the tertiary amine-borane and the trityl salt may each be dissolved in separate portions of acetonitrile and the two solutions mixed together. Where the ligand is one which is more reactive than acetonitrile for the purposes of the present reaction, the tertiary amine-borane may be dissolved in one portion of acetonitrile and the trityl salt and the ligand for the reaction may be dissolved in a second portion of acetonitrile and these two solutions mixed together. Where the ligand is more reactive than acetonitrile it preferentially will enter into the reaction. Examples of such more highly reactive ligands are pyridine, quinoline, trimethylamine, trimethylphosphine, etc.

It is preferred that the foregoing reactions be performed under anhydrous conditions since the presence of moisture interferes with the proper performance of this reaction and serves to greatly reduce the yields of the desired products. The reaction occurs easily and rapidly at atmospheric pressure and room temperature or below merely upon stirring the various ingredients together. Of course, suitable precautions should be taken in the performance of this reaction to prevent the reaction from getting out of control. Among these precautions might be mentioned, dropwise addition of reagents where necessary to minimize heat build-up, cooling, if necessary, to prevent acceleration of the reaction due to the heat build-up, etc.

While the reaction does occur readily at atmospheric pressure and at or below room temperature, higher or lower pressures and higher or lower temperatures may be used as may be desired. For example, this reaction can be performed at pressures of from about 100 mm. Hg to about 5 atmospheres and at temperatures of from about −78° C. to about +100° C. The three reactants may be used in stoichiometrical proportions or an excess (e.g., 0.1 to about 1000 mole percent excess or more) of any of the reactants may be used.

It will be noted that the foregoing reaction produces a product which has two ligands attached to the central boron atom of the cation. By suitable selection of the amine-borane and the ligand, boron-containing cations can be produced wherein the two ligands are the same as or different from each other. Examples of these cations wherein the two ligands are different from each other are:

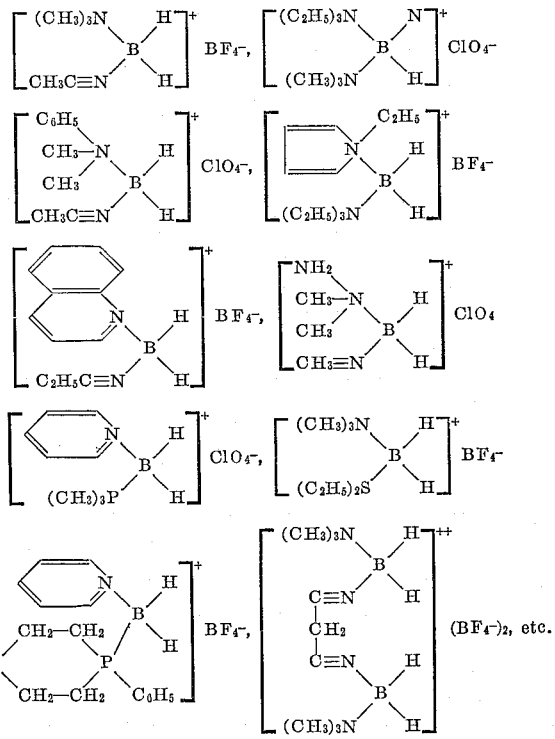

The compounds of this invention are useful as high energy solid rocket propellant ingredients, burning rate modifiers for rocket propellants, and as intermediates for the preparation of other compounds having useful properties, such as by metathesis with compounds having suitable high boron-containing anions to yield high boron-containing compounds for use as fuels for rocket propulsion.

For a clearer and more detailed understanding of the nature of the present invention reference may be had to the following examples which are intended as illustrative only and not as limitations on the invention. In the following examples all parts are by weight unless otherwise noted.

*Example 1*

Synthesis of

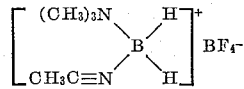

Trityl fluoroborate (9.9 g.; 0.03 mole) in dry acetonitrile (50 ml.) was added dropwise over a 30 minute period to a solution of trimethylamine-borane (2.19 g.; 0.03 mole) in dry acetonitrile (10 ml.). The colorless reaction mixture was stirred for an additional 10 minutes after the addition was completed and was then evaporated to dryness under reduced pressure. Triphenylmethane was separated from the solid residue by three extractions with benzene (70 ml. total). The crude product, which is benzene isoluble, weighed 5.74 g. (96% yield). It was purified by dissolving it at room temperature in 5 ml. of acetonitrile and then slowly adding 20 ml. of benzene to precipitate the product. In this manner 3.64 g. of product was collected, M.P. 107.5–109°. An additional 0.6 g. of material with identical M.P. was isolated from the filtrate. Total, 4.24 g. (71% yield). Two additional recrystallizations of a portion of this material raised the M.P. to 109–110° C.

*Analysis.*—Calc'd for $C_5H_{14}N_2B_2F_4$: C, 30.05; H, 7.06; N, 14.02; B, 10.83. Found: C, 29.63; H, 6.86; N, 14.33; B, 10.30.

Example 2

In the manner of Example 1, 0.03 mole of trityl fluoroborate dissolved in dry acetonitrile is reacted separately with 0.03 mole of each of the following dissolved in dry acetonitrile:

Pyridine-borane to produce pyridine-acetonitrile-dihydridoborn fluoroborate;
N-methylpyrrole-borane to produce N-methylpyrrole-acetonitrile-dihydridoborane fluoroborate;
Phenyldimethylamine-borane to produce phenyldimethylamine-acetonitrile-dihydridoboron fluoroborate;
Benzyldiethylamine-borane to produce benzyldiethylamine-acetonitrile-dihydridoboron fluoroborate.

Example 3

Preparation of

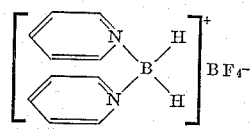

A solution of trityl fluoroborate (1.65 g.; 5 mmoles) and pyridine (0.4 ml.; 5 mmoles) in 10 ml. of dry acetonitrile was added to pyridine-borane (0.51 ml.; 5 mmoles) held in a flask cooled to −55° C. While the reaction mixture was being warmed to room temperature during a one-hour period, 15 cc. of gas was evolved. The homogeneous solution was evaporated to dryness under reduced pressure, and from the residue, triphenylmethane was extracted with benzene. Recrystallization of the benzene-insoluble solid from methanol-ether gave a 52% yield of $(C_5H_5N)_2BH_2{}^+BF_4{}^-$.

Example 4

In the manner of Example 3, solutions in dry acetonitrile of 5 mmoles of trityl fluoroborate and 5 mmoles of ligand are reacted with 5 mmoles of tertiary amineborane as follows:

Trimethylamine with pyridine-borane to produce trimethylamine-pyridine-dihydridoboron fluoroborate
Triethylamine with triethylamine-borane to produce bis(triethylamine)-dihydridoboron fluoroborate
Diethyl sulfide with pyridine-borane to produce diethylsulfide-pyridine-dihydridoboron fluoroborate
Trimethylphosphine with trimethylamine-borane to produce trimethylamine - trimethylphosphine - dihydridoboron fluoroborate
Dimethylphenylphosphine with dimethylphenylamine-borane to produce dimethylphenylphosphine - dimethylphenylamine-dihydridoboron fluoroborate.

We claim:
1. A compound having the formula

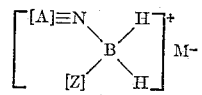

wherein M⁻ is selected from the group consisting of $BF_4{}^-$, and $ClO_4{}^-$; wherein [A]≡N is a tertiary amine ligand moiety in which the nitrogen atom shown is bonded to carbon atoms of radicals selected from the group consisting of hydrocarbon radicals and substituted hydrocarbon radicals and not more than one nitrogen atom of another amine radical; and wherein [Z] is a ligand selected from the group consisting of tertiary amines in which the nitrogen atom is bonded only to carbon atoms, nitriles, di-lower alkyl sulfides, and tertiary phosphines in which the phosphorus atom is bonded only to carbon atoms; said [A]≡N always being different from said [A].

2.

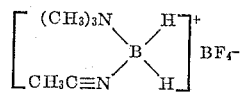

3. A salt of

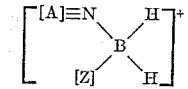

wherein [A]≡N is a tertiary amine legand moiety in which the nitrogen atom shown is bonded only to carbon atoms of radicals selected from the group consisting of hydrocarbon radicals and substituted hydrocarbon radicals and not more than one nitrogen atom of another amine radical; and wherein [Z] is a ligand selected from the group consisting of tertiary amines in which the nitrogen atom is bonded only to carbon atoms, nitriles, di-lower alkyl sulfides, and tertiary phosphines in which the phosphorus atom is bonded only to carbon atoms; said [A]≡N always being different from said [Z].

4. A process for preparing boron-containing cations comprising reacting, under anhydrous conditions, a tertiary amine-borane with a trityl salt and a ligand.

5. A process for preparing trimethylamine-acetonitrile-dihydridoboron fluoroborate comprising reacting, under anhydrous conditions, trimethylamine-borane and trityl fluoroborate with acetonitrile.

6. A process for preparing bis(pyridine)-dihydridoboron fluoroborate comprising reacting, under anhydrous conditions, trityl fluoroborate and pyridine with pyridine-borane.

7. A process as defined in claim 6 wherein said reaction is performed in an acetonitrile solution.

No references cited.

WALTER A. MODANCE, *Primary Examiner.*
A. L. ROTMAN, *Assistant Examiner.*